MULTICHANNEL SCANNING SYSTEM

Filed Oct. 25, 1956 3 Sheets-Sheet 1

INVENTORS
LOUIS SHAPIRO &
JOHN S. RYDZ
BY Morris Rabkin
ATTORNEY

INVENTORS
LOUIS SHAPRIO &
JOHN S. RYDZ
BY Morris ... [signature]
ATTORNEY

INVENTORS
LOUIS SHAPIRO &
JOHN S. RYDZ
BY Morris R. Rabkin
ATTORNEY

United States Patent Office 2,921,975

Patented Jan. 19, 1960

2,921,975

MULTICHANNEL SCANNING SYSTEM

Louis Shapiro and John S. Rydz, Haddonfield, N.J., assignors to Radio Corporation of America, a corporation of Delaware Application October 25, 1956, Serial No. 618,342

6 Claims. (Cl. 178—5.2)

This invention relates to a multichannel scanning system, and particularly to phototube circuits for such a scanning system incorporating electronic compensation for optical distortions in the scanning system.

This invention may be used in an electronic color correction system, for example, of the type described in an article entitled "Photographic and Photomechanical Aspects of Color Correction," by J. S. Rydz, et al., in the "Sixth Annual Proceedings of the Technical Association of the Graphic Arts," 1954, at page 139. In such a system, a cathode ray tube is used as a flying spot scanner for scanning transparencies in the form of three photographic color separations of a colored subject to be reproduced; these three separations relate, respectively, to three primary colors or tristimulus values. By means of the scanner and separate phototubes, electrical signals are derived, which are proportional to the transmission characteristics, and thereby to the color-component characteristics, of corresponding picture elements or areas of the color separations. These signals are applied to a computer, which produces corrected signals representative of ink percentages to be printed. The corrected signals are used to vary the light intensity of another, image-producing cathode ray tube and to expose a set of corrected color separations. From the corrected color separations, a set of printing plates is made, which plates are employed to reproduce the original subject.

In such a system, the transparencies may be prepared by means of standard photographic techniques, which may include the use of contact print methods. In such contact prints, the picture information inherently involves diffuse picture densities rather than specular densities. Likewise, the sensing of picture information from such separations should be on a diffuse transmission basis. However, a scanning system such as that mentioned above operates by applying focused rays of light to the separations. Collection of the transmitted portions of this light is on a geometric ray basis, which results, essentially, in only the specularly transmitted components being received by the phototubes.

Photographic density measured by specular methods results in different measured values of density from that using diffuse methods. The relationship between diffuse density and specular density may be approximated by the Callier coefficient. The basic relationship between transmission and density is that density is equal to the log of the reciprocal of the transmission. Accordingly, the transmission measurements made on a specular basis incorporate non-linearities which correspond to the departure from diffuse density.

It has also been found that, in a scanning system of the aforementioned type, an appreciable amount of spurious ambient light is present. This spurious light is due to mechanisms such as flare light in the cathode ray tube and light scattering by various optical components. This spurious light has been found to be a substantial percentage of the scanning light.

In the aforementioned scanning system, there are three optical channels, each corresponding to a different one of the primary colors. The light values in these three optical channels may not be the same for corresponding picture information in the original subject or for corresponding density values in the separations of the subject being scanned. Such differences may be due to differences or necessary tolerances in exposure and development of color separations, which differences may result in different density ranges or different effects of the nonlinear photographic characteristic in one separation as against another (it has been found desirable, for example, to use the non-linear toe of this photographic characteristic in order to gain high transmission values in the resulting separations.) Another reason for such differences is that there may be differences between the channels in their optical characteristics; such effects (for example, an effect like cosine fourth that is due to the optical geometry) may affect the value of the Callier coefficient. Different density ranges of the photographic images in the three optical channels generally will also result in different distortion waves due to the Callier coefficient. Furthermore, there may be substantial variations in the value of the Callier coefficient with density differences.

It is among the objects of this invention to provide:

A new and improved multichannel scanning system which includes compensation for optical distortions in the scanning system;

A new and improved multichannel scanning system which includes electronic compensation for optical distortions in the scanning system and adjustments for differences in these distortions between channels.

In accordance with this invention, a cathode ray tube scanning system is used to scan a transparency of a colored subject. The transparency density values vary with the primary color characteristics of the subject. The scanning system is mounted within a light-tight housing and includes a plurality of optical channels, one for each primary color, and a plurality of photoelectric receptors, one for each channel. Separate compensating circuits mounted adjacent the photoreceptors include electronic circuits for compensating the Callier coefficient effects of the respective optical channel as well as other optical distortions. These compensating circuits include individual signal level and gain adjustments, whereby the electrical signals corresponding to primary color values may be consistently related at both limits of the signal range as well as at all intermediate signal steps. These compensated primary-color signals are applied to and combined in a suitable electronic device.

The foregoing and other objects, the advantages and novel features of this invention, as well as the invention itself both as to its organization and mode of operation, may be best understood from the following description, when read in connection with the accompanying drawing, in which like references refer to like parts, and in which.

Figure 1:
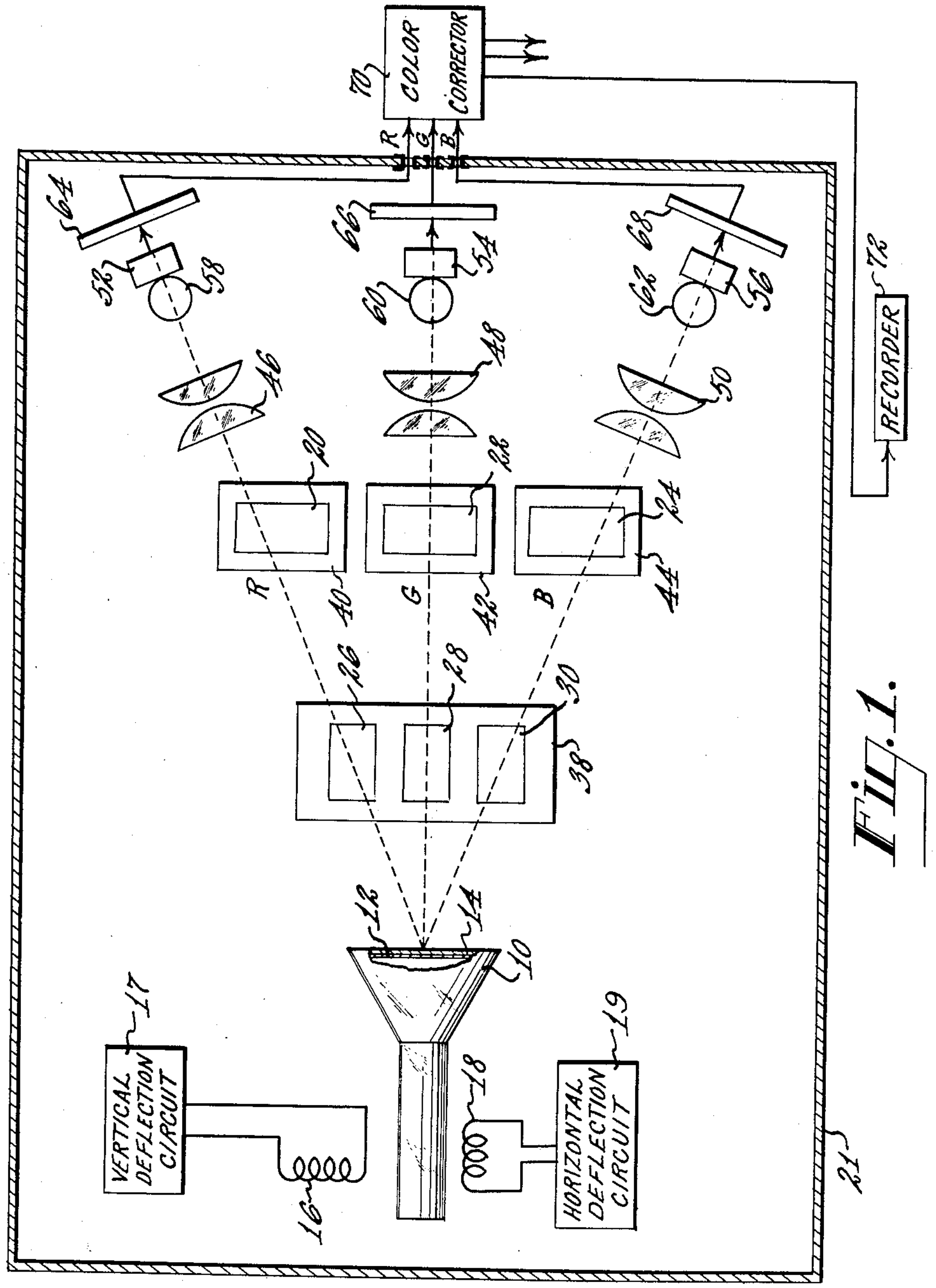
Figure 1 is a schematic optical and electrical diagram of a multichannel scanning system embodying the invention.

A cathode ray tube 10 is used as a flying spot kinescope to provide a scanning light spot. The light spot is formed on a phosphor screen 12 deposited on the inside surface of the kinescope faceplate 14. Vertical and horizontal deflection coils 16 and 18, respectively, are provided to produce vertical and horizontal deflections of the light spot, thereby forming a raster on the screen 12 of the tube 10. Appropriate deflection circuits 17 and 19 are connected to the deflection coils 16, 18. A beam focusing system (not shown) is also provided.

A light-tight housing 21 encloses the cathode ray tube 10 and the remainder of the scanning system that is now described. The scanning light spot formed at the phosphor screen 12 is directed to corresponding areas of three uncorrected separation transparencies 20, 22, 24. These transparencies 20, 22, 24 may be monochrome separation positives of a colored subject, which positives are prepared from negatives that are exposed, for example, through red, green, and blue filters, respectively. The optical channels respectively associated with these separations may be identified by the associated primary color of the filter and are referenced by the corresponding letters R, G, and B. The optical paths from the object plane of the kinescope faceplate 14 to the transparencies 20, 22, 24 are by way of separate imaging lenses 26, 28, 30. The imaging lenses 26, 28, 30 may be substantially identical and of the symmetrical type. Where operated under a condition of unit magnification, a symmetrical lens has a minimum distortion. Symmetrical lenses having flat fields are used, in order that these lenses may be positioned in parallel planes, and the color separations may also be positioned in parallel planes. The lenses 26, 28, 30 are adjustably mounted in the frame 38 by appropriate means (not shown) for adjustment along the respective optical paths. The aperture stops (not shown) of the lenses 26, 28, 30 may be adjusted to vary the intensity of the imaged light spot. An appropriate imaging system is described in the patent U.S. No. 2,740,832.

The color separations 20, 22, 24 are mounted in supporting frames 40, 42, 44, respectively. Separate three-point register mechanisms (not shown) are used in the frames 40, 42, 44 to position the separations in planes parallel to the principal plane of the associated lenses 26, 28, 30, respectively. Additional means (not shown) may be provided in each frame 40, 42, 44 for adjusting the separations transversely of the optical paths, and for rotating each separation around the central axis of the associated paths.

The light passing through the color separations 20, 22, 24 is collected by separate condenser lenses 46, 48, 50 and directed to separate phototubes 52, 54, 56, respectively. Optical integrating spheres 58, 60, 62 may be used to collect the light passing through the transparencies 20, 22, 24 and to direct it to the associated phototubes 52, 54, 56.

The electrical outputs of the phototubes 52, 54, 56 are respectively applied to phototube circuits 64, 66, and 68. The outputs of the circuits 64, 66, and 68 are applied to a device 70 for combining the signals from those circuits. In the aforementioned color-correction system, this device 70 may be a color-correction computer such as the one described in the patent U.S. No. 2,434,561. The outputs of this color-corrector device 70 may be electrical signals corresponding to colored ink values that may be used to reproduce the original subject. These output signals from the color-corrector 70 may be applied to a recorder 72 for exposing corrected photographic separations that may be used in making printed plates for reproducing the original subject. An appropriate form of recorder 72 that includes another cathode ray tube system is described in the patent U.S. No. 2,740,828.

The overall operation of the system of Figure 1 is as follows: The scanner operates to derive electrical signals in accordance with the color characteristics of an original subject. These color characteristics are represented by transparency density values in the separations 20, 22, and 24. The electrical signals from the scanner are applied to the color-corrector 70, which, in turn, derives electrical signals corresponding to ink values that would reproduce generally the original colored subject. The signals from the color corrector 70 are applied to a recorder 72 to produce a set of corrected photographic separations that may be used to make printed plates to reproduce the original subject.

Figure 2:
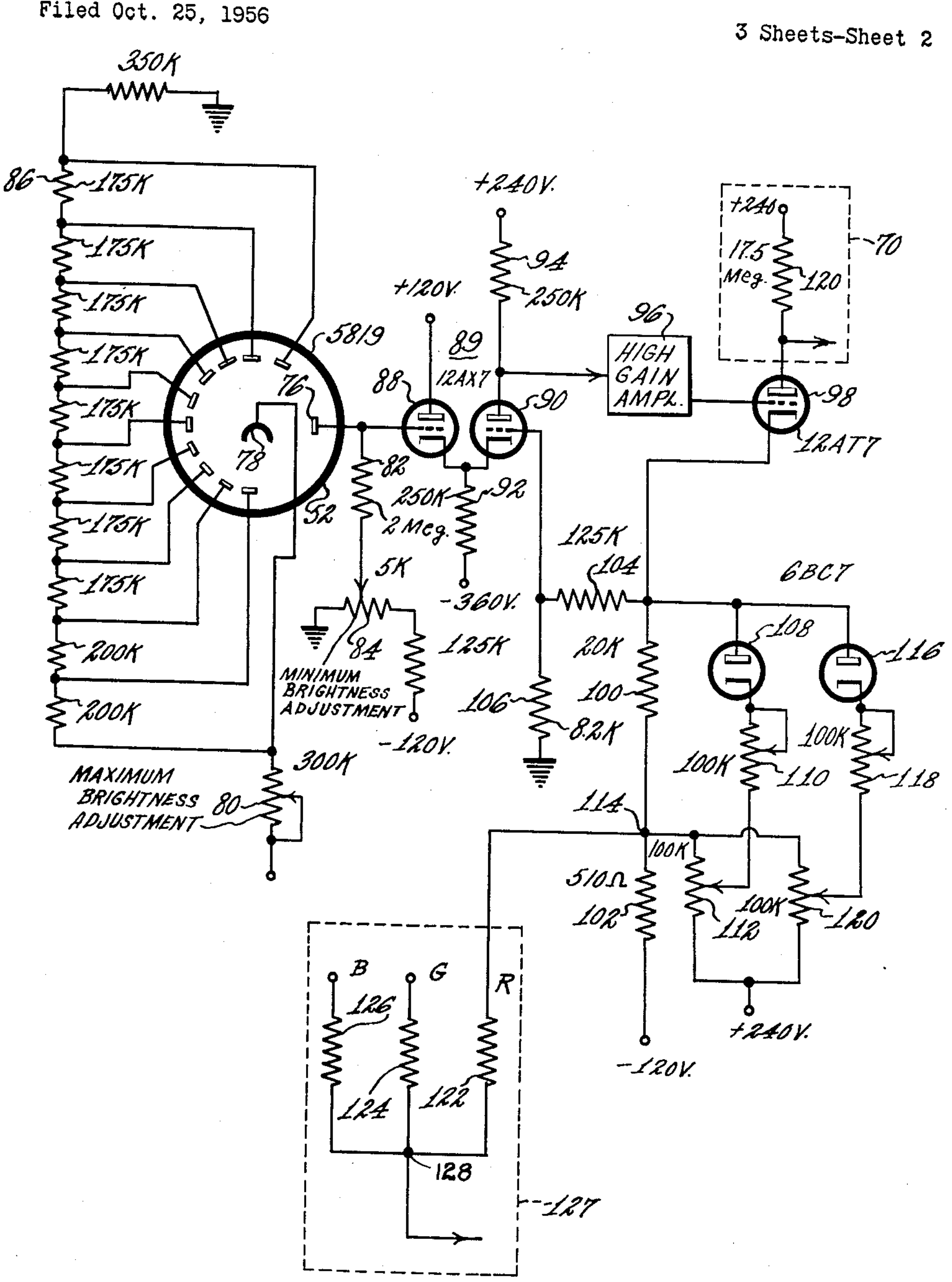
Figure 2 is a schematic circuit diagram of a phototube circuit embodying this invention that may be used in the system of Figure 1.

In Figure 2, an electronic circuit is shown that may be used for the phototube 52 and phototube circuit 64 of Figure 1. The phototube circuits 66 and 68 are generally the same as that shown in Figure 2 except as noted hereinafter. In Figure 2, the phototube 52 is shown as a photomultiplier having an anode 76, a cathode 78, and ten dynode stages. An adjustable resistor 80 is connected between the cathode 78 and a source of negative operating potential. A load resistor 82 is connected between the anode 76 and a potentiometer 84, which is used to adjust the operating potential applied to the anode 76. Operation of the photomultiplier 52 is based on ten cascaded dynode stages, which operate on the principle of secondary emission. The gain of each such stage is determined by the voltage existing across the stage. Adjacent dynode steps are connected by resistors 86, which form a voltage divider network between the last stage and the cathode 78.

The anode of the photomultiplier 52 is connected to the grid of a triode 88. The cathode of the triode 88 is connected to the cathode of a second triode 90 and, also, through a common cathode resistor 92 to a source of negative potential. The two triodes 88, 90 form a direct-coupled differential amplifier 89. A feedback voltage is applied to the grid of the tube 90. The anode of the tube 90 is connected through a load resistor 94 to a source of positive operating potential and, also, to a high-gain amplifier 96. This amplifier 96 may be a direct-coupled amplifier stage of the same type as that of the amplifier 89, and serves merely to supply additional gain that may be needed and to position the voltage at an appropriate level. The output of the amplifier 96 is applied to the grid of a triode 98. The cathode impedance of the tube 98 includes, in part, the series combination of resistors 100 and 102. A feedback network from the cathode of the tube 98 is by way of a series combination of resistors 104 and 106. The junction of these resistors 104, 106 is connected to the grid of the differential-amplifier tube 90; the other terminal of the resistor 106 is connected to a reference potential shown as ground.

A non-linear diode compensating network is connected in shunt to the cathode resistor 100 to form the remainder of the cathode impedance for the tube 98. This compensating network includes a diode 108, the anode of which is connected to the cathode of the tube 98, and the cathode of which is connected through an adjustable resistor 110 to an adjustable tap on a resistor 112. The resistor 112 is connected between the junction 114 and a source of positive voltage. A second diode 116 is connected in a similar manner between the cathode of the tube 98 and a terminal of an adjustable resistor 118. The other terminal of the resistor 118 is connected to the adjustable tap of a resistor 120, which is connected between the junction 114 and the positive voltage source.

The anode of the tube 98 is connected by way of a resistor 120 to a source of positive operating potential. This resistor 120 may be a current-summing resistor in a color-correction computer 70, such as that described in the aforementioned patent, U.S. No. 2,434,561. In that computer system, the inputs to the computer are currents, say from the tube 98 (and from corresponding tubes of the phototube circuits 66 and 68 for the other channels). If the color-corrector system that is used requires a voltage input, the resistor 120 may be used as a load resistor, and the anode voltage of the tube 98 would be taken as the desired voltage.

The resistor 102 in the cathode network of the tube 98 is a small resistor used to sample the current in the cathode network and to provide a voltage at the junction 114 proportional to that current. This voltage at the junction 114 is applied to a resistor 122 of a resistor matrix 127 that also includes resistors 124 and 126. The resistors 124 and 126 receive at one terminal corresponding voltages from the phototube circuits 66 and 68 of the green and blue channels, respectively. The other terminals of the resistors 122, 124, and 126 are connected together at a junction 128; the voltage at the junction 128 is proportional to a weighted sum of the voltages received by these resistors 122, 124, 126, the values of the resistors determining the weights of the voltages. With suitable resistor values, the voltage at the junction 128 is proportional to a luminance function of the compensated primary-color signals. Such a luminance-function signal may be used for deriving a neutral or black-printer corrected signal in combination with the colored-ink corrected signals derived by means of the color corrector 70.

The phototube circuit of Figure 2 operates generally as follows: The current drawn by the photomultiplier 52 is proportional to the intensity of the light received by the photomultiplier (which light intensity is proportional to the light transmitted by the transparency 20). The anode voltage, which is developed across the load resistor 82, is applied to the grid of the differential amplifier tube 88; the grid of the other tube 90 receives a feedback voltage at a proper level by way of the feedback resistor combination 104, 106. An error signal is developed at the anode of the tube 90 which is proportional to the difference between the photomultiplier anode voltage and the feedback voltage. This error signal is amplified in the differential amplifier 89, and further amplified in the amplifier 96 and applied to the grid of the tube 98. The tube 98 operates as a current amplifier. The two amplifier stages 89 and 96 drive the tube 98, which operates like a cathode follower. The tube 98 is driven to produce a voltage at its cathode such that the feedback voltage at the grid of the tube 90 becomes substantially equal to the photomultiplier anode voltage applied to the grid of the tube 88. Thus, the feedback circuit operates to develop at the cathode of the tube 98 a voltage proportional to the photomultiplier anode voltage. This voltage at the cathode of the tube 98 is at a substantially higher level than that from the photomultiplier and may be used to operate the diode network at desirably high voltage levels.

For cathode voltages of the tube 98 below a certain magnitude, the diodes 108 and 116 are biased off in the back direction by the voltages at the adjustable taps of the resistors 112 and 120. Consequently, the anode-cathode current in the circuit of the tube 98 (which current is a function of the cathode resistance) is proportional to its cathode voltage and, thus, to the photomultiplier anode voltage. As the photomultiplier anode voltage increases, a level is reached at which the cathode voltage of the tube 98 exceeds the bias voltage applied to the cathode of the diode 108, and that diode 108 conducts. The diode 108, when conducting, connects the resistors 110 and 112 in circuit with the cathode resistor 100 to provide effectively a shunt resistance to that cathode resistor 100. The setting of the resistor 110 effectively determines the amount of compensating current through the diode 108. The combined cathode resistance with the diode 108 conducting is decreased such as to increase the cathode current in the tube 98. A similar additional change in the voltage-current characteristic of the circuit of the tube 98 is produced when the cathode voltage of the tube 98 exceeds the bias applied to the cathode of the diode 116.

The overall phototube circuit of Figure 2 may be considered as a feedback loop that includes a non-linear circuit element (namely, the circuits of the diodes 108 and 116) in the feedback or beta network of the loop. The position of this non-linear circuit element in the feedback loop results effectively in an inversion of the effect of stray capacitances from a frequency-deteriorating effect to a frequency-peaking effect. This inversion effect results from the high forward gain of the feedback loop being controlled or reduced by the usual feedback factor due to the action of the beta network. Where such control by the beta network is impaired or delayed by stray capacitances, the forward section of the feedback loop, with its high gain, amplifies the high frequency portion of the signal and produces an effect of high frequency peaking. This condition permits the entire non-linear diode compensating network to be positioned outside of the circuits 64, 66, and 68 at any convenient location remote from the scanner housing 21; any stray capacitance due to such remote positioning tends to add to the overall high frequency response of the phototube circuit. If high frequency peaking tends to be excessive, it can be reduced by various appropriate means, such as control of the frequency characteristic of the forward section of the feedback loop. Each phototube circuit 64, 66, 68 is a complete unit that provides a highly precise current or voltage output at a low impedance level. All of the necessary controls, the gain adjustment 80, the D.-C. level adjustment 84, and the adjustable resistors of the compensating network, may be positioned remotely outside of the scanner housing 21 without any deleterious effects on the operation.

Figure 3:
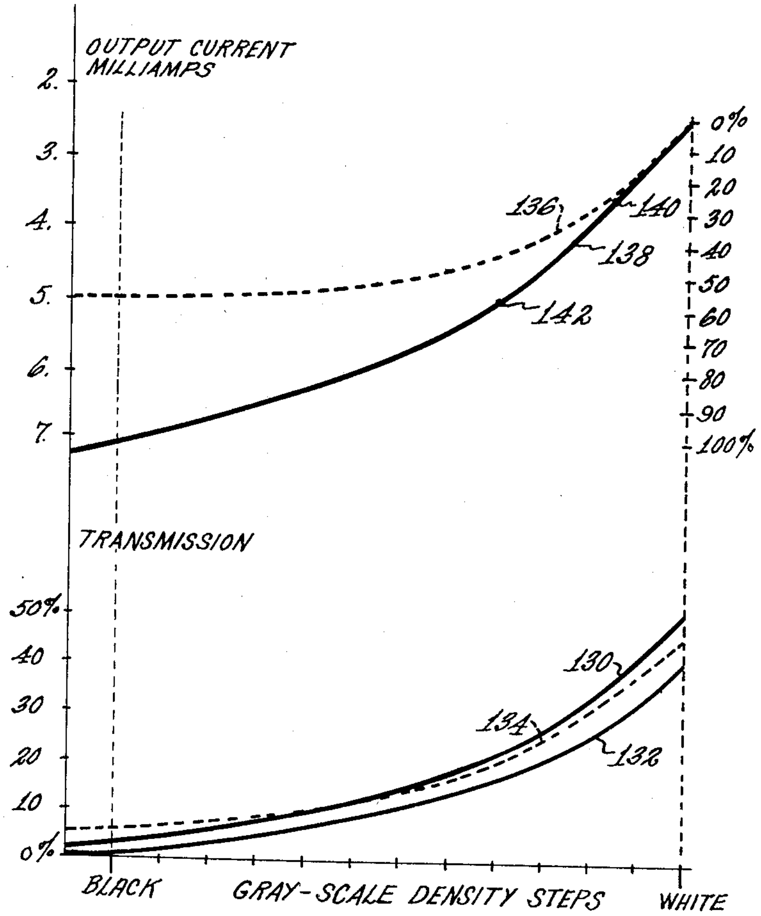
Figure 3 is an idealized graph of the transfer characteristics of different portions of the system of Figures 1 and 2.

Reference is made to the idealized graph of Figure 3 to explain the operation of the diode network in compensating for the non-linear transfer characteristic of the red optical channel in the scanner of Figure 1. The abscissa of the graph of Figure 3 is a set of equal-density gray-scale steps ranging from an extreme of highest density or black, B, to the other extreme of lowest density or white, W. One set of ordinates plotted against this gray scale abscissa is a set of transmission values for such a gray scale. The curve 130 is a graph illustrating the ideal logarithmic relationship between transmission and density, with both transmission and density being diffuse, that is:

$$D=\log\frac{1}{T}$$

The curve 132 is a graph of the transmission values for the gray scale steps with a constant Callier effect assumed; that is, the curve 132 is based on specular transmission measurements, in which not all of the transmitted light is received by the phototube 52. The ratio of the specular density to the diffuse density is known as the Callier coefficient, which coefficient for the curve 132 is assumed to be substantially constant at a value of about 1.3. The curve 134 is an idealized graph of the actual transfer characteristic of one of the channels in the scanning system. This graph 134 includes effects other than those represented by the Callier coefficient, other effects such as spurious light due to cathode ray tube flare light and light scattering by optical components. This spurious light has been found to be approximately constant over the range of scanned densities. The curve 134 may be derived by scanning a standard gray-scale transparency and measuring the current values in the tube 98 with the diode network disconnected from the circuit.

Two other curves 136 and 138 in Figure 3 are plotted on the same gray-scale abscissa coordinate as the curves 130, 132, 134, but on a different ordinate scale corresponding to the anode-cathode current in the tube 98. The ordinate scale of the curves 136, 138 is also calibrated as "transmission" in terms of normalized ink values used by the computer, in which 0% ink is white and 100% ink is black. The curve 136 is the actual transfer characteristic of the system without compensation, and is, in effect, the curve 134 on a different ordinate scale. The curve 138 is the compensated transfer characteristic of the phototube circuit of Figure 2 due to the operation of the compensating network provided by the diodes 108 and 116. This compensated curve 138 is substantially the same as the ideal transmission-density characteristic 130.

The diode compensating circuit may be set up as follows: The potentiometer 84 is adjusted to set the value of the photomultiplier anode voltage for minimum phototube current; this setting corresponds to the black limit of the density range and, also, to the maximum value of current in the tube 98. This setting of the potentiometer 84 may be such as to provide an output current of about 5 milliamperes in the tube 98 as shown for the graph 136 in Figure 3. The output-current values shown in Figure 3 are consistent with the circuit parameters presented in Figure 2 to illustrate an operative embodiment of the circuit.

The adjustment of the resistor 80 determines, by voltage division with the dynode resistors 86, the cathode voltage of the photomultiplier 52. Thus, the setting of the resistor 80, after the potentiometer 84 is set, determines the operating voltage across the photomultiplier and, thereby, the gain of the photomultiplier (that is, the change in photomultiplier current for a given change in received light). The adjustment of the resistor 80 may be used to adjust the value of output current through the tube 98 for the white extreme of the density range; this may be approximately 2.5 milliamperes as shown in Figure 3 for the curve 136.

With the adjustments 84 and 80 set in this manner, the phototube circuit requires no compensation for the extreme gray-scale steps at the white end of the range; for, as shown in Figure 3, the curves 136 and 138 are concurrent in this region from the white limit to about the point 140. The adjustment of the resistor 112 determines the bias voltage applied to the cathode of the diode 108 and, thus, the output-current value at which this diode 108 starts to conduct. As shown in Figure 3, this output-current value at which the diode 108 starts to conduct, represented by the point 140, is a little less than 4 milliamperes. The adjustment of the resistor 110 determines the amount of compensating current drawn by the diode 108 and, thus, the slope of the curve 138 for the region between the points 140 and 142. In a similar manner, the resistor 120 is adjusted to permit the diode 116 to start to conduct when the output current exceeds about 5.5 milliamperes (point 142 in Figure 3); the adjustment of the resistor 118 determines the slope of the curve 138 for values of output current in excess of 5.5 milliamperes to the black limit of 7 milliamperes.

To summarize: The adjustment of the potentiometer 84 adjusts the minimum brightness or black level of the output current; the resistor 80 adjusts the maximum brightness or white level of the output current; the resistors 112, 120 are used to adjust the points at which the slope of the curve 138 changes; and the settings of the resistors 110, 118 determine the slope of that curve 138. The phototube circuits 66 and 68 of the other channels are individually adjusted in a similar manner; generally, the limits of the output-current range, and the curve of the compensated characteristic are the same for all three channels.

Generally, it may be necessary to make such adjustments of the phototube circuits 64, 66, 68 every time a different photographic subject is scanned. In order for the computer 70 or for the luminance signal circuit 127 to combine properly the signals from the three channels, it is necessary to have complete congruence of all the gray-scale steps for the three primary-color signals. However, such congruence may not exist for a number of reasons:

Differences or necessary tolerances in the exposure and development of color separations may result in different density ranges as well as in different patterns of distortion of the gray scale for the three separations and associated optical channels. For example, it has been found desirable to use a part of a non-linear toe of the photographic characteristic to take advantage of the low photographic density (and resulting small light losses during scanning) in this toe region. There may be different density ranges in the three separations which would produce substantial variations in gray-scale slope due to the Callier coefficient as well as possible appreciable changes in Callier coefficient and vary the compensation required between channels. The photographic emulsion characteristics may vary from time to time, and it may be advantageous to use different emulsions (for example, to gain certain spectral responses) for the separations in the different channels. In addition, variations in the value of the Callier coefficient between channels may result from cosine fourth effects due to some of the separations being positioned off the illumination axis in an arrangement such as is shown in Figure 1. For these reasons, it may be necessary to adjust the phototube circuits individually for each set of separations to be scanned.

Such readjustment of the phototube circuits is generally the same as that described above. The adjustment of the potentiometer 84 provides the direct-voltage input level adjustment and, thereby, the direct-output-current level for the black end of the transmission range. The alignment of the three channels in this manner at the same direct current output level for black tends to match the black end of a common neutral axis for the three channels. The gain adjustment of the photomultiplier 52 by means of the resistor 80 serves to match up the three channels for the white end of the neutral axis. The adjustment of the diode compensating network, through adjustment of the resistors 110, 112, 118, 120, ensures that the intermediate gray-scale steps are congruent. Thus, these adjustments together tend to preserve a common neutral axis for all three channels.

In accordance with this invention, a new and improved multichannel scanning system is provided. This system includes phototube circuits that incorporate electronic compensation for optical distortions in the scanning system. These circuits also include means to adjust for differences in the distortions between the channels and, thereby, to insure that the output signals of these phototube circuits are aligned at the limits of their ranges and are congruent at intermediate gray-scale steps.

What is claimed is:

1. In a color correction system, the combination of a multichannel scanning system for deriving color component signals in accordance with the color component characteristics of a subject; and color correction means for combining said signals; said multichannel scanning system comprising means for producing a moving light spot over a raster, said light spot producing means including a cathode ray tube; a plurality of optical channels, each of said channels being associated with a different component color and including a different photoreceptor for producing electrical signals variable over a range in accordance with the light received, and a different lens means for specularly directing to the associated photoreceptor the light from said light spot that passes through a transparent photographic subject having diffuse density values that vary with said color component characteristics; and a plurality of electronic circuits each connected to receive the signals produced by a different one of said photoreceptors, each of said circuits individually including; a first means for adjusting the signal level of the circuit output at one limit of the signal range, a second means different from said first means for adjusting the gain of the circuit, and an adjustable nonlinear compensating network adapted to influence the output of said circuit over a portion of its operating range for compensating said signals for differences in the associated channel between diffuse and specular density values, whereby the outputs of said circuits are variable over the same range of values and corresponding intermediate output values represent substantially the same diffuse density values.

2. A multichannel scanning system comprising means for producing a moving light spot over a raster, said light spot producing means including a cathode ray tube; a plurality of optical channels, each of said channels being associated with a different primary color and including a different photoreceptor for producing electrical signals variable over a range in accordance with the light received, separate means for specularly directing to the associated photoreceptor the light from said light spot that passes through a transparent photographic subject having diffuse density values that vary with color characteristics; and a plurality of electronic circuits each connected to receive the signals produced by a different one of said photoreceptors, each of said circuits individually including: a non-linear compensating network for influencing the operation of the circuit over a portion of the signal range for compensating said signals for differences in the associated channel between diffuse and specular density values, first means for adjusting the output signal level of said circuit at one limit of the signal range, and second means different from said first means for adjusting the gain of the circuit, whereby each of said electronic circuits is adjustable so that corresponding range limits of the output signals from said circuits and corresponding intermediate signal steps relating to the same diffuse density values are substantially the same.

3. In a system for obtaining color corrected records from a plurality of transparent photographic separations having diffuse density values that vary with associated color component chracteristics of a subject, the combination of a multichannel scanning system for deriving color component signals in accordance with the color component characteristics of said subject, said multichannel scanning system comprising means for producing a moving light spot over a raster, said light spot producing means including a cathode ray tube; means for supporting a plurality of said color separations associated with different component colors; a plurality of optical paths each including an individual photoreceptor for producing electrical signals variable over a range in accordance with the light received, and an individual lens means for directing to the associated color separation the light of said light spot and for specularly directing to the associated photoreceptor the light that passes through the associated color separation; and a plurality of electronic circuits each connected to receive the signals produced by a different one of said photoreceptors, each of said circuits individually including: a non-linear compensating network adapted to influence the operation of the associated electronic circuit over a portion of its operating range to compensate said signals for differences in the associated path between diffuse and specular density values, first adjusting means for adjusting the output signal level of the circuit at one limit of the signal range, and second adjusting means different from said first adjusting means for adjusting the gain of the circuit, whereby corresponding range limits of the outputs of the signals from said circuits and corresponding intermediate signal steps relating to the same diffuse density values are substantially the same.

4. In a system for obtaining color corrected records from a plurality of transparent photographic separations having diffuse density values that vary with associated color component characteristics of a subject, the combination of a multichannel scanning system for deriving color component signals in accordance with the color component characteristics of said subject, said multichannel scanning system comprising means for producing a moving light spot over a raster, said light spot producing means including a cathode ray tube; means for supporting a plurality of said color separations associated with different component colors; a plurality of optical paths, each of said paths including a different photoreceptor for producing electrical signals variable over a range in accordance with the light received, and a different lens means for directing to the associated color separation the light of said light spot and for specularly directing to the associated photoceptor the light that passes through the associated color separation; and a plurality of electronic circuits each connected to receive the signals produced by a different one of said photoreceptors, each of said circuits individually including a non-linear feedback arrangement for compensating said signals for differences in the associated path between diffuse and specular density values and for photographic non-linearities of the associated separation, a first adjusting means for adjusting the circuit output level at one limit of the signal range, and a second adjusting means different from said first adjusting means for adjusting the gain of the circuits, whereby corresponding range limits of the outputs and corresponding intermediate output steps from each of said circuits relate to the same diffuse density values.

5. In a system for obtaining color corrected records from a plurality of transparent photographic separations having diffuse density values that vary with associated color component characteristics of a subject, the combination of a multichannel scanning system for deriving color component signals in accordance with the color component characteristics of said subject, said multichannel scanning system comprising means for producing a moving light spot over a raster, said light spot producing means including a cathode ray tube; means for supporting a plurality of said color separations associated with different component colors; a plurality of optical paths, each of said paths including a different photoreceptor for producing voltages variable over a range in accordance with the light received, and a different lens means for directing to the associated color separation the light of said light spot and for specularly directing to the associated photoreceptor the light that passes through the associated color separation; and a plurality of electronic circuits each connected to receive the signals produced by a different one of said photoreceptors, each of said circuits individually including a non-linear compensating arrangement for compensating said signals for differences in the associated path between diffuse and specular density values, said compensating arrangement including an impedance means and a plurality of unilateral impedance combinations connected in parallel with said impedance means to provide a resultant impedance network with said impedance means, said impedance network having different impedance values at different voltages applied thereto, each of said electronic circuits further including a feedback circuit responsive to the voltage from the associated photoreceptor for applying an amplified voltage to the associated impedance network, first adjustable means for adjusting the output level of the circuit at one limit of the signal range, and second adjustable means for adjusting the gain of the circuit, whereby corresponding range limits of the outputs from said circuits and corresponding intermediate output steps relate to substantially the same diffuse density values.

6. In a system for obtaining color corrected records from a plurality of transparent photographic separations having diffuse density values that vary with associated color component characteristics of a subject, the combination of a multichannel scanning system for deriving color component signals in accordance with the color component characteristics of said subject, said multichannel scanning system comprising means for producing a moving light spot over a raster, said light spot producing means including a cathode ray tube; means for supporting a plurality of said color separations associated with different component colors; a plurality of optical paths, each of said paths including a different photomultiplier circuit for producing voltages variable over a range in accordance with the light received, and a different lens means for directing to the associated color separation the light of said light spot and for specularly directing to the associated photomultiplier the light that passes through the associated color separation; and a plurality of electronic circuits each connected to receive the signal voltages produced by a different one of said photomultipliers, each of said circuits individually including an adjustable non-linear compensating network for compensating said signal voltages for differences in the associated path between diffuse and specular density values and for photographic non-linearities of the associated separation; each said photomultiplier circuit individually including a first adjustable means for adjusting the voltage level at one of the photomultiplier electrodes to set the voltage level corresponding to one limit of the light received, and a second adjustable means different from said first adjustable means for adjusting the voltage level across the photomultiplier electrodes to set the voltage level corresponding to the other limit of the light received, whereby corresponding range limits of the signals from said circuits and intermediate signal steps in corresponding circuits relating to the same diffuse density values are substantially the same.

References Cited in the file of this patent

UNITED STATES PATENTS

| | | |
|---|---|---|
| 2,710,889 | Tobias | June 14, 1955 |
| 2,721,892 | Yule | Oct. 25, 1955 |
| 2,740,828 | Haynes | Apr. 3, 1956 |

OTHER REFERENCES

Frayne et al.: Densitometers for Control of Color Motion-Picture Film Processing, February 1955, Journal of the SMPTE, vol. 64, pages 67–68.